March 1, 1938.
N. G. CARLSON
2,109,791
RAIL BOND AND METHOD OF SECURING SAME TO RAILS
Filed Nov. 27, 1935
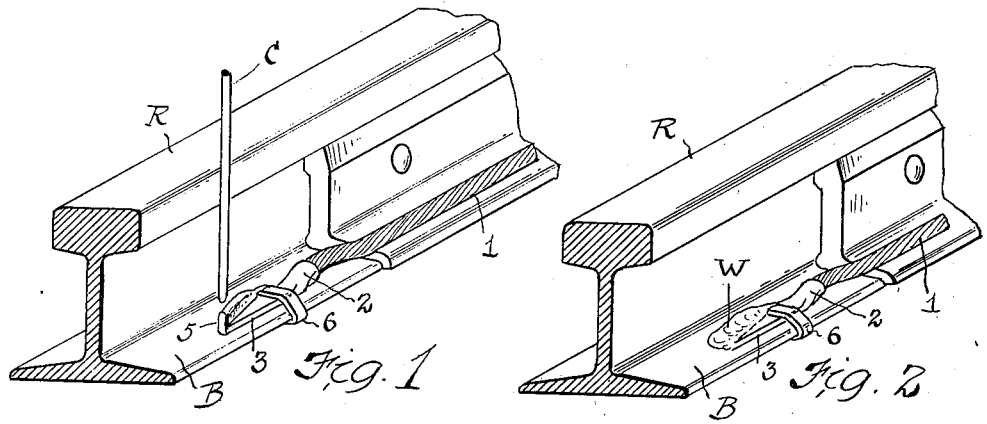
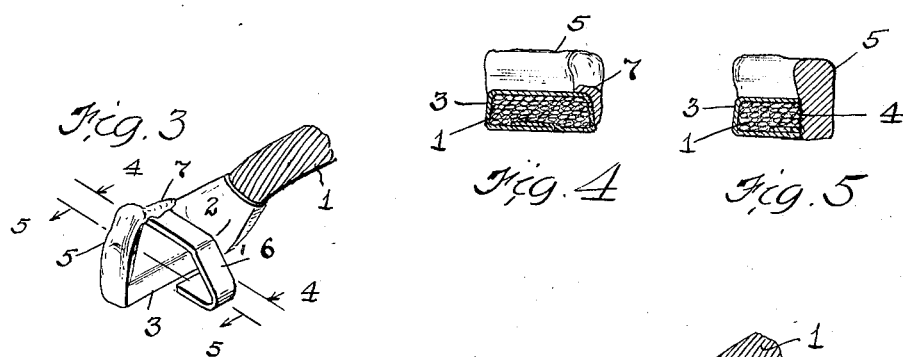
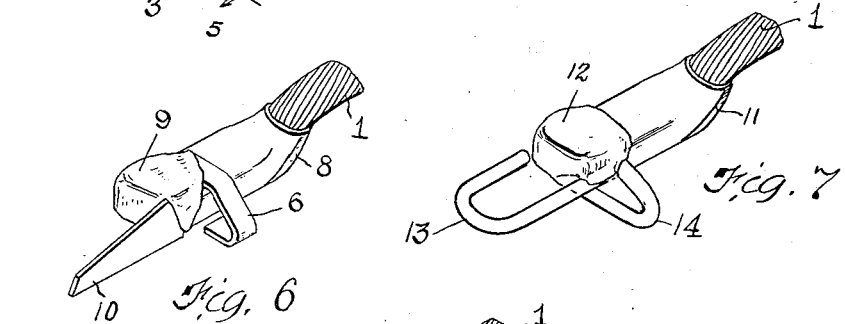
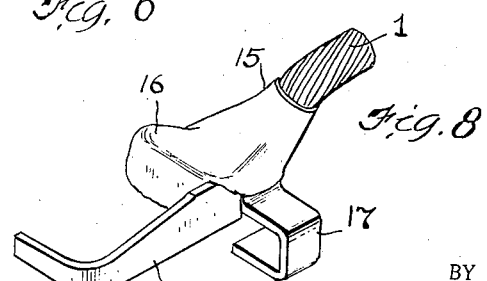
INVENTOR.
Noble G. Carlson
BY
Fay, Oberlin & Fay
ATTORNEYS.

Patented Mar. 1, 1938

2,109,791

UNITED STATES PATENT OFFICE 2,109,791

RAIL BOND AND METHOD OF SECURING SAME TO RAILS

Noble G. Carlson, Cleveland, Ohio, assignor to The Electric Railway Improvement Company, Cleveland, Ohio, a corporation of Ohio Application November 27, 1935, Serial No. 51,852

4 Claims. (Cl. 173—278)

This invention relates, as indicated, to rail bonds and methods of securing the same to rails, but has reference more particularly to rail bonds which are especially adapted for application to rails of positive polarity, as for example, third rails and the like.

In the arc welding of rail bonds to the rails of electrical transportation lines, the prevailing practice is to use for welding purposes a motor generator set or a resistance unit. The motor generator set is advantageous from the standpoint of power economy and choice of polarity of arc, while the resistance unit is as a rule more portable than the motor generator set, but its use is confined to a single or fixed polarity determined by the polarity of the traveled rails, which is usually negative, the polarity of the trolley or third rail used in conjunction with the traveled rails in such case being positive.

The electric arc consists of rays radiating from a focus or crater at the positive pole toward, and with a grasping spread upon, the negative pole. A carbon electrode at the negative pole is sharpened by the arc, but if placed at the positive pole, the same electrode would be shattered by an uncontrollable arc unless the diameter and core of the electrode were such as to be conducive to the formation of a crater.

If now a coated metallic welding rod is used in place of the carbon electrode, the arc rays which in the previous case sharpened the carbon electrode immediately destroy the coating if used with negative polarity. If, however, the metallic electrode is given positive polarity, the metal of the rod becomes the yielding core and the coating the refractory rim for the arc crater, and such a rod, even if made of non-ferrous metal, may have imparted thereto heat and penetration sufficient for welding and even cutting.

Such a metallic rod can obviously be used only for welding rail bonds to negative rails, and it has heretofore been found necessary, where the welding equipment comprises a resistance unit, to employ as a source of heat for welding rail bonds to positive rails, as, for example, third rails, a carbon arc, and to feed in the weld metal from the hand of the welder. In other words, the welder in such cases, is obliged to hold the carbon electrode with one hand and the weld metal, usually in the form of a wire, with his other hand. The difficulties of welding under these circumstances are usually such that there is considerable waste of weld metal, which is in most cases a rather expensive alloy; the feeding of the weld metal adjacent high voltage rails, such as third rails, is attended with considerable danger to the welder; and the bonds as heretofore made when placed in welding position on a rail are often poorly placed for making welds to all of the strands of the conductor and considerable skill on the part of the welder is required to effect a complete weld. Some of these difficulties and disadvantages are also incidental to the securing of rail bonds to rails by ordinary gas welding methods, as will be apparent to those skilled in the art to which this invention relates.

The present invention has as its primary object the provision of a rail bond having terminals which are so designed and constructed as to permit the bond to be welded to positive rails, as for example, third rails, by the usual gas and carbon arc welding methods without the difficulties and disadvantages in welding and the dangers incident to the employment of such methods in the welding of bonds to positive rails and the like, as hereinbefore stated.

Another object of the invention is to provide a rail bond having the weld metal, or metal heretofore fed into the weld by hand, integrally or otherwise secured to the terminals of the bond, preferably in the process of manufacture of the bond, thereby dispensing with the necessity of feeding an extraneous supply of such metal to the weld.

A further object of the invention is to provide a rail bond of the character described in which the weld metal is so disposed on the terminals of the bond that it can be readily drawn down and placed in the weld solely by manipulation of the gas welding torch or carbon arc.

A still further object of the invention is to provide a novel method of welding rail bonds to rails whereby the element of danger in welding such bonds to rails is minimized and excellent welds secured.

To the accomplishment of the foregoing and related ends, said invention, then, consists of the means hereinafter fully described and particularly pointed out in the claims; the annexed drawing and the following description setting forth in detail certain means and one mode illustrating, however, but one of the various ways in which the principle of the invention may be used.

In said annexed drawing:—

Fig. 1 is a fragmentary perspective view showing a portion of a rail bond embodying the novel features of the invention positioned on a rail base preparatory to the welding operations; Fig. 2 is a view similar to Fig. 1, but showing the bond completely welded to the rail base; Fig. 3 is an enlarged fragmentary perspective view of a terminal of a rail bond embodying the novel features of the invention; Fig. 4 is a transverse cross-sectional view of the terminal of Fig. 3, taken on the line 4—4 in said figure; Fig. 5 is a transverse cross-sectional view of the terminal of Fig. 3, taken on the line 5—5 of said figure; Figs. 6, 7, and 8 are fragmentary perspective views of modified forms of rail bond terminals embodying the principal features of the invention.

Referring more particularly to that form of the invention shown in Figs. 1 to 5 inclusive of the drawing, it will be seen that the rail bond proper is of the form generally disclosed in Figs. 2 to 4 inclusive of Cadwell Patent No. 1,852,694 and consists of a conductor body 1 formed from a stranded copper cable, and a terminal 2 which is designed to be welded to the base B of the rail R, this terminal being formed by first sheathing the end of the cable in a thin sheet 3 of copper in order to give form to such terminal and strength against vibration and shock when the bond is welded to the rail. The terminal, including such sheath or sheave 3 and the portions of the strands of the body that enter therein, is then flattened by means of a suitable die under a hammer or press so that such strands are left in tightly compressed condition, as shown in Figs. 4 and 5. The flattening of the terminal is graduated at its inner end as shown in Fig. 3, the sleeve being left in its original approximately circular form at such end so that the entering strands may have a slight amount of relative movement at the point in question. The terminal is then subjected to a shearing operation on a line at an angle to the median line of the terminal so as to present for welding an increased area of contact over that presented by a normal section of the flattened terminal.

To the sheared face 4 of the terminal is welded a wall of weld metal 5, which is of substantial thickness and extends vertically to a substantial distance above the upper surface of the copper sheath 3. The weld metal 5 is preferably an alloy of copper and silicon or copper, silicon and manganese, and is so disposed on the terminal proper that when the terminal is positioned on the rail base B, as shown in Fig. 1, the weld metal can be readily drawn down by manipulation of the arc produced by a carbon electrode C or by the flame of a gas welding torch, to form the weld W, as shown in Fig. 2. It should be noted that the weld metal forms an integral part of the terminal, is provided in an amount sufficient to provide all of the metal required for the weld, and that an extraneous supply of welding metal is therefore not required. This leaves the welder with one of his hands free and thus minimizes the danger incidental to the securing of rail bonds to high voltage third rails and the like. Moreover, the weld metal is so placed on the terminal that an excellent weld can be produced even by a welder of ordinary skill, the sheared face 4 of the terminal providing a dam for preventing loss or undue spreading of the weld metal. In order to maintain the terminals in proper welding position on the rail base, a clamp 6 is provided for each terminal, this clamp being secured to the terminal as by a small amount of weld metal 7, and embracing the rail base, as clearly shown in Figs. 1 and 2.

In that form of the invention shown in Fig. 6, the terminal 8 is sheared on a line normal to the median line of the terminal and is provided adjacent the sheared face with a supply of weld metal 9. This weld metal is not only provided in an amount sufficient to provide a weld to a rail base, but also in an amount sufficient to secure to the terminal a rail base clamp 6 and a dam 10 of sheet steel which serves to hold the weld metal within proper bounds during the welding operation.

In Fig. 7, the terminal 11 is similar in form to terminal 8 of Fig. 6, and the weld metal 12 serves to secure to the terminal a device comprising a U-shaped dam portion 13 and a rail base clamp portion 14, this device being formed from a steel rod.

In Fig. 8, the terminal 15 is also somewhat similar in form to the terminal 8 of Fig. 6, and the weld metal 16 serves to secure to the terminal a U-shaped rail base clamp 17 and an L-shaped dam 18, the clamp and dam being formed from steel bars.

Other modes of applying the principle of my invention may be employed instead of the one explained, change being made as regards the means and the steps herein disclosed, providing those stated by any of the following claims or the equivalents be employed.

I therefore particularly point out and distinctly claim as my invention:—

1. An article of manufacture comprising a preformed rail bond having a quantity of weld metal welded to said bond, said weld metal being different from the metal of said bond, said quantity being sufficient to weld said rail bond to a rail, a substantial portion of said weld metal lying outwardly of the outermost face of an end of said rail bond when said rail bond is in position to be welded, so that a welding flame may contact said weld metal directly and thereby effect a weld between said rail bond and a rail.

2. An article of manufacture comprising a preformed rail bond having a terminal and a quantity of weld metal integrally secured to said terminal, said weld metal being different from the metal of said rail bond, said quantity being sufficient to weld said terminal to a rail, a substantial portion of said weld metal lying outwardly of the outermost face of said terminal when said terminal is in position to be welded to said rail, so that a welding flame may contact said weld metal directly and thereby effect a weld between said terminal and a rail.

3. An article of manufacture comprising a preformed rail bond having a terminal and a quantity of weld metal integrally secured to said terminal, said weld metal being different from the metal of said rail bond, said quantity being sufficient to weld said terminal to a rail, a substantial portion of said weld metal lying outwardly of the outermost face of said terminal when said terminal is in position to be welded to said rail, so that a welding flame may contact said weld metal directly and thereby effect a weld between said terminal and a rail, the body portion of said rail bond comprising a stranded conductor and said terminal comprising a sheath of electrically conductive material.

4. The method of joining a rail bond having an attached terminal to a rail which comprises, first welding a quantity of weld metal to the terminal, to form a wall of such weld metal projecting outwardly of the outermost face of said terminal when said terminal is in position to be welded to said rail, then shipping said rail bond with its pre-attached quantity of weld metal to a point of installation, then abutting said terminal against said rail and finally applying a weld flame directly to said weld metal to melt said wall of weld metal and cause the same to flow downwardly upon said rail.

NOBLE G. CARLSON.